(12) United States Patent
Diekhans et al.

(10) Patent No.: US 7,742,860 B2
(45) Date of Patent: Jun. 22, 2010

(54) ROUTE PLANNING SYSTEM AND METHOD FOR AGRICULTURAL WORKING MACHINES

(75) Inventors: Norbert Diekhans, Guetersloh (DE);
Jochen Huster, Guetersloh (DE);
Andreas Brunnert, Delbrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 940 days.

(21) Appl. No.: 11/143,901

(22) Filed: Jun. 2, 2005

(65) Prior Publication Data

US 2005/0273253 A1   Dec. 8, 2005

(30) Foreign Application Priority Data

Jun. 3, 2004   (DE) .................. 10 2004 027 242

(51) Int. Cl.
*G06F 7/70* (2006.01)
(52) U.S. Cl. .................. 701/50; 701/202; 701/213
(58) Field of Classification Search ............ 701/50, 701/202, 213
See application file for complete search history.

(56) References Cited

U.S. PATENT DOCUMENTS

| 5,987,383 A * | 11/1999 | Keller et al. ............ 701/213 |
| 6,128,574 A * | 10/2000 | Diekhans ............... 701/209 |
| 2004/0193348 A1* | 9/2004 | Gray et al. ............. 701/50 |

FOREIGN PATENT DOCUMENTS

| DE | 102 19 500 A1 | 11/2003 |
| EP | 0 821 296 A2 | 1/1998 |
| WO | 95/02318 | 1/1995 |

\* cited by examiner

*Primary Examiner*—Mark Hellner
*Assistant Examiner*—Helal A Algahaim
(74) *Attorney, Agent, or Firm*—Michael J. Striker

(57) ABSTRACT

In a route planning system and method for agricultural working machines, a defined working width is assigned to the agricultural working machines to generate driving routes in a territory, and dynamic adaptation of the planned driving route is carried out thereby ensuring that the driving route to be covered is flexibly adaptable to changing external conditions such as driving around obstacles, thereby largely relieving the operator of the agricultural working machine of the task of performing laborious steering maneuvers.

42 Claims, 5 Drawing Sheets

ROUTE PLANNING SYSTEM AND METHOD FOR AGRICULTURAL WORKING MACHINES

BACKGROUND OF THE INVENTION

The present invention relates to a route planning system and method for agricultural working machines.

It was already known from EP 0 660 660 to equip agricultural working machines with "GPS" systems to record the position of the agricultural harvesting machine in an area to be worked. In this process, the operator of the machine determined the route to be driven, and the GPS system—that is actively connected to a recording unit—delivered the position data of the vehicle, which were then used in the recording unit to electronically depict the driving path that had been covered. Systems of this type were an initial step in the direction toward recording driving routes, whereby the initial application was only to record driving routes. It was not possible to use systems of this type to perform advance planning of driving routes to be worked.

Building logically on the idea of displaying driving routes, systems as described in EP 0 821 296 enable the generation of driving routes as a function of external geometries of agricultural useful areas to be worked. The main advantage of these systems is that, for the first time, driving routes can be determined in advance with consideration for diverse optimization criteria, which, in the simplest case, are subsequently processed automatically by the agricultural working machine. Based on the fact that driving paths were defined in advance based on simple geometric interrelationships, systems of this type are only capable of processing the singularly predetermined driving route, whereby deviations from this driving route are displayed or corrected immediately.

SUMMARY OF THE INVENTION

Accordingly, it is an object of the present invention to provide a route planning system and method for agricultural working machines, which are further improvements of existing systems and methods.

More particularly, it is an object of present invention to provide a route planning system and method that can react flexibly to changing external conditions.

In keeping with these objects and with others which will become apparent hereinafter, one feature of the present invention resides, briefly stated, in a route planning system for agricultural working machines, comprising means for assigning a defined working width to the agricultural working machines to generate driving routes in a territory, and for dynamic adaptation of the planned driving route, thereby ensuring that the driving route to be covered is flexibly adaptable to changing external conditions such as driving around obstacles, thereby largely relieving the operator of the agricultural working machine of the task of performing laborious steering maneuvers.

Another feature of the present invention resides in a route planning system for agricultural working machines, comprising means for assigning a defined working width to the agricultural working machine to generate driving paths for working a territory, and formulating a working strategy.

A further feature of the present invention resides in a route planning method for agricultural working machines, comprising the steps of assigning a defined working width to the agricultural working machines to generate driving routes in a territory; and carrying out for dynamic adaptation of the planned driving route, thereby ensuring that the driving route to be covered is flexibly adaptable to changing external conditions such as driving around obstacles, thereby largely relieving the operator of the agricultural working machine of the task of performing laborious steering maneuvers.

Still another feature of the present invention resides in A route planning method for agricultural working machines, comprising the steps of assigning a defined working width to the agricultural working machine to generate driving paths for working a territory, and formulating a working strategy.

The fact that the route planning system allows dynamic adaptation of the planning driving route ensures that the driving route to be worked is adaptable in a flexible manner to changing external conditions such as driving around obstacles, so that the operator of the agricultural working machine is fully relieved of the task of returning the working machine to the originally generated driving route. This also has the advantage that the operator can change the working sequence on a certain territory at any time, and the route planning system automatically generates a new driving route that takes this change into account, which said driving route can be worked automatically by the working machine.

Since the operator can intervene in the steering of the working machine in any manner at any time, dynamic adaptation of the route planning is attained, in the simplest case, by the fact that the driving route is adapted dynamically as a function of the actual machine position and the actual machine orientation.

The method of dynamic driving route adaptation functions that much more precisely the more frequently the actual machine position and the actual machine orientation are queried. A dynamic driving route adaptation that functions in a permanent manner is therefore proposed in an advantageous further development of the present invention.

In the simplest case, the driving route is generated based on a large number of driving paths in a manner known per se. Each of these driving paths is capable of being determined based on optimization criteria, and the sequence in which they will be worked is defined by these or other optimization criteria.

To increase the efficiency of the working process and ensure that the territory to be covered is rolled over to a minimum extent as a ground-saving measure, the optimization criteria to be taken into account by the route planning system can be, in particular, "consideration for the shortest working path", or, analogously, "consideration for the shortest working time". Associated directly therewith is the further optimization criterium "reduction of unproductive auxiliary time". The objective of said further optimization criterium is to realize the shortest possible paths between consecutive driving paths to be worked, and to minimize the driving routes between the agricultural working machine and, e.g., a hauling vehicle. In addition, the route planning process itself is optimized by the fact that the route planning system recognizes driving routes and working sequences that have already been covered and completed and accesses them directly when generating new driving routes in the same territory.

To allow the operator of the agricultural working machine the greatest amount of influence possible over the route planning system, a further advantageous embodiment of the present invention provides that the operator can discard the driving path preselected by the route planning system to be worked and select another previously determined driving path or suggest any other driving route that he has identified himself. In an advantageous further development of the present invention, the route planning system is configured such that, when a driver-determined driving path is selected, the route planning system generates a new driving route composed of driving paths based on this driving route suggested by the operator.

Given that the route planning system is designed such that it can formulate working strategies, the precondition is created that allows the route planning system to coordinate the driving routes and associated working sequences of a large number of agricultural working machines. In the simplest case, the working strategy can be formulated by harmonizing the driving routes—composed of parallel driving paths and turn-around curves—of various vehicles such that the working machines that are working together always use nearly the same driving tracks and always turn around in nearly the same areas. Furthermore, the working strategy can take the kinematics of the agricultural working machines and the geometry of the areas to be worked into account. The particular advantage of this is that, e.g., when combine harvesters are working together with one or more hauling vehicles, it can be ensured that the hauling vehicles are positioned such that the combine harvesters can be positioned conveniently near the hauling vehicles to unload the grain, i.e., the hauling vehicles must be surrounded by a sufficient amount of driveable territory depending on the turning circle of the combine harvester and the length of the particular unloading devices. Furthermore, the working strategy to be formulated can be made dependent on customer requests, whereby the customer usually prescribes working sequences, adherence to certain parameters, such as grain losses during grain harvesting, and adherence to working times, such as completing the harvesting work before a bad weather front arrives.

The fact that the route planning system is also configured such that it recognizes driving routes and working strategies considerably reduces the amount of computing effort required to determine the driving paths that form the driving route. In this context, a particularly efficient route planning system is created when the route planning system can access stored driving strategies that define either the interplay of working machines working simultaneously or in succession in the particular territory and defines their optimal driving routes in the particular territory.

To simplify the computation steps and to depict them visually, a "master line" is defined to determine the driving route in the route planning system. The further driving paths are depicted such that they are offset from this master line by the working width or a multiple of the working width of the agricultural working machine. In an advantageous further development of the present invention and with the same effects, the master line, which is drawn straight or curved, is defined by at least two path points separated by a distance, whereby the virtual extension of the master line through these two path points that are separated by a distance serves as a guide line, based on the orientation of which the agricultural working machine is guided on the territory to be worked. In the simplest case, the operator of the agricultural working machine defines the master line by entering coordinates.

To reduce the amount of memory required and to accelerate the computation process to determine the driving route, algorithms are stored in the route planning system that reduce the path points required to depict curved master lines with consideration for the necessary accuracies.

To obtain driving routes having a transparent structure and a reduced number of steering maneuvers for the agricultural working machine, it is advantageous when the route planning system according to the present invention first defines driving paths that replicate the shape of the outer contour of the territory to be worked or obstacles to be driven around and subsequently generates driving paths that extend nearly parallel with each other, whereby the length of the driving paths of the driving route that was generated is determined substantially by the outer contour of the territory to be worked or the obstacles to be driven around.

To allow the agricultural working machines to turn around at the end of the particular driving paths to reach the next driving path to be worked and to leave non-worked areas or areas with plants growing on them untouched, a virtual extension of the driving paths in their end regions is proposed according to a further advantageous embodiment of the present invention. This has the particular advantage that the agricultural working machine is driven correspondingly far way from the plot before the turning procedure is started.

To ensure that the operator of the agricultural working machine has direct influence on the sequence in which the driving paths generated by the route planning system are worked, the driving route formed of the driving paths is first displayed visually to the operator, at least in the end regions of the driving paths. If the operator decides to follow a driving path that differs from the one suggested by the route planning system as the next one to work, the route planning system automatically determines the turning curve required to reach the desired driving path. The particular advantage of this is that the driver is further relieved of the task of performing somewhat difficult steering maneuvers in the turn-around region.

In the simplest case, the next driving path to be worked is selected using a "touch-screen" monitor.

The operator of the agricultural working machine also has the option, in a manner known per se, of shifting the driving paths determined by the route planning system using suitable input means, thereby enabling compensation, e.g., for GPS inaccuracies.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
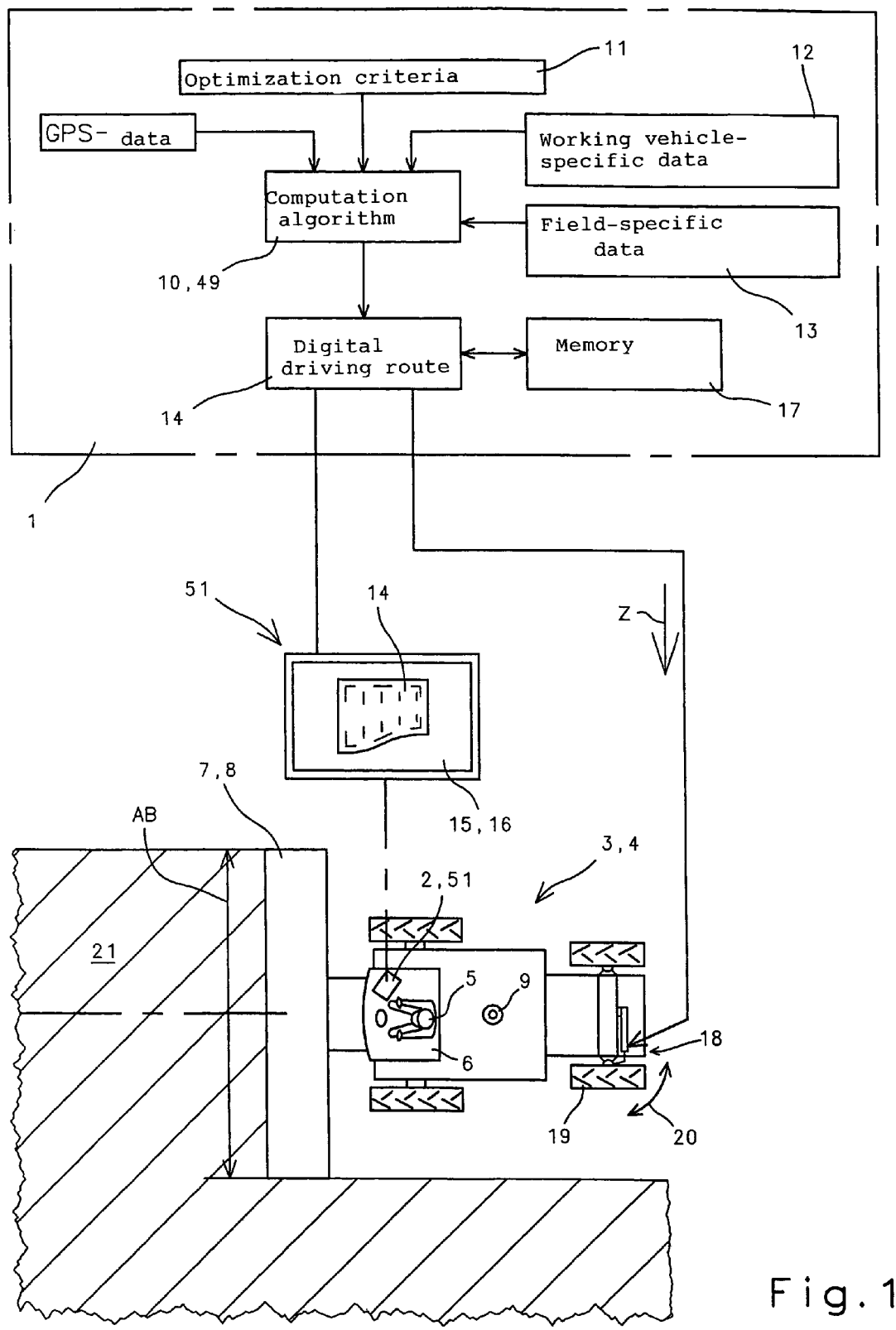
FIG. 1 shows the schematic representation of the route planning system and method according to the present invention.

FIG. 1 shows a schematic representation of route planning system 1, which implements route planning method and was made known in EP 0 821 296, and which is integrated in an arithmetic and display unit 2 of an agricultural working machine 4 configured as a combine harvester 3. Arithmetic and display unit 2 is located in driver's cabin 6, within viewing and operating distance of operator 5 of combine harvester 3. An attachment 8, which is configured, e.g., as a grain cutting device, is assigned to the front side of combine harvester 3, the width of the attachment determining the working width AB of combine harvester 3. In addition, agricultural working machine 4 includes a "GPS" antenna 9 for receiving position coordinates via GPS.

According to an enlarged section outlined with dashed lines in FIG. 1, the route planning system includes one or more computation algorithms 10 that generate position coordinates of agricultural working machine 4 in a manner known per se based on the GPS signals received by GPS antenna 9. With consideration for optimization criteria 11 of working machine-specific data 12 and field-specific data 13, which will be explained below in greater detail, computation algorithms 10 generate digitized driving routes 14 which, in the simplest case, are displayed to operator 5 in driver's cabin 6 via a display unit 16 designed as monitor 15. In addition, route planning systems 1 of this type can be configured such that generated driving routes 14 are stored in a memory unit 17 such that they can be repeatedly called up. It is also known to derive control signals Z from generated driving routes 14, which influence steering 18 of agricultural working machine 4 as a direct function of the shape of driving routes 14 in such a manner that steered wheels 19 are deflected 20 depending on driving route 14.

Figure 2:
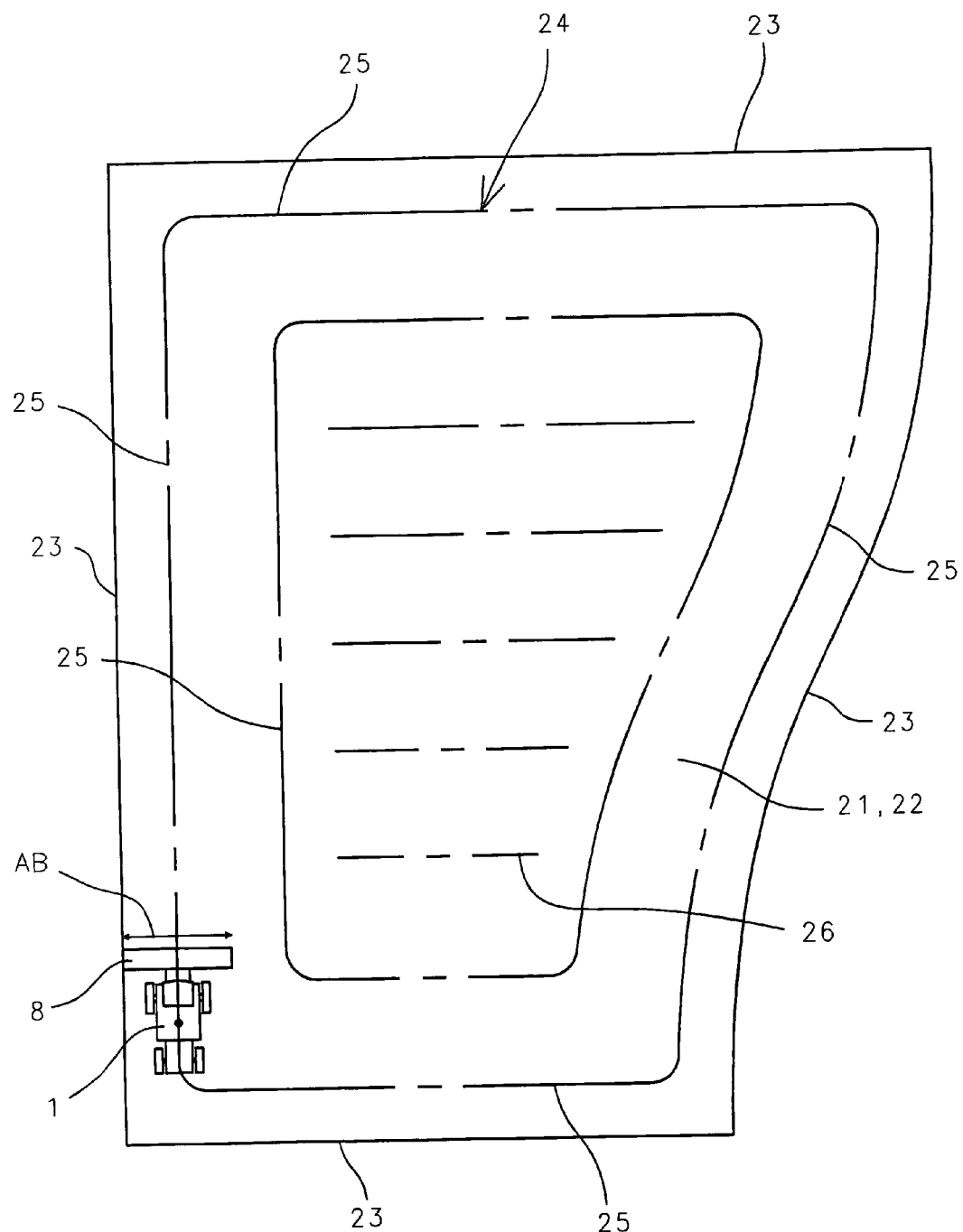
FIG. 2 shows a territory to be worked, subdivided into driving paths.

FIG. 2 shows a territory 21, namely a grain field 22 to be harvested, to be covered by an agricultural working machine 4 configured as combine harvester 3. Grain field 22 selected as an example includes outer contours 23 that are straight and curved. The geographic data of these outer contours 23 can be determined by combine harvester 3 itself by operator 5 of combine harvester 3 driving along these outer contours 23, whereby route planning system 1 generates a first driving route 24 during this drive using GPS signals. In the simplest case, route planning system 1 defines this driving route 24 in a position that corresponds approximately to the center of working width AB of attachment 8, whereby the reproduction of outer contour 23 of covered territory 21 is realized by lining up a large number of driving paths 25. Route planning systems 1 of this type, with consideration for the parameters shown in FIG. 1, such as highly diverse optimization criteria 11 and working machine-specific and field-specific data 12, 13, can generate further driving paths 25, 26 in a manner known per se which, in the simplest case, are located substantially parallel to each other and either replicate relatively complicated outer contour 23 or are straight. To ensure that territory 21 can be worked completely, the distances between adjacent driving paths 25, 26 approximately correspond to the working width AD of attachment 8.

Figure 3:
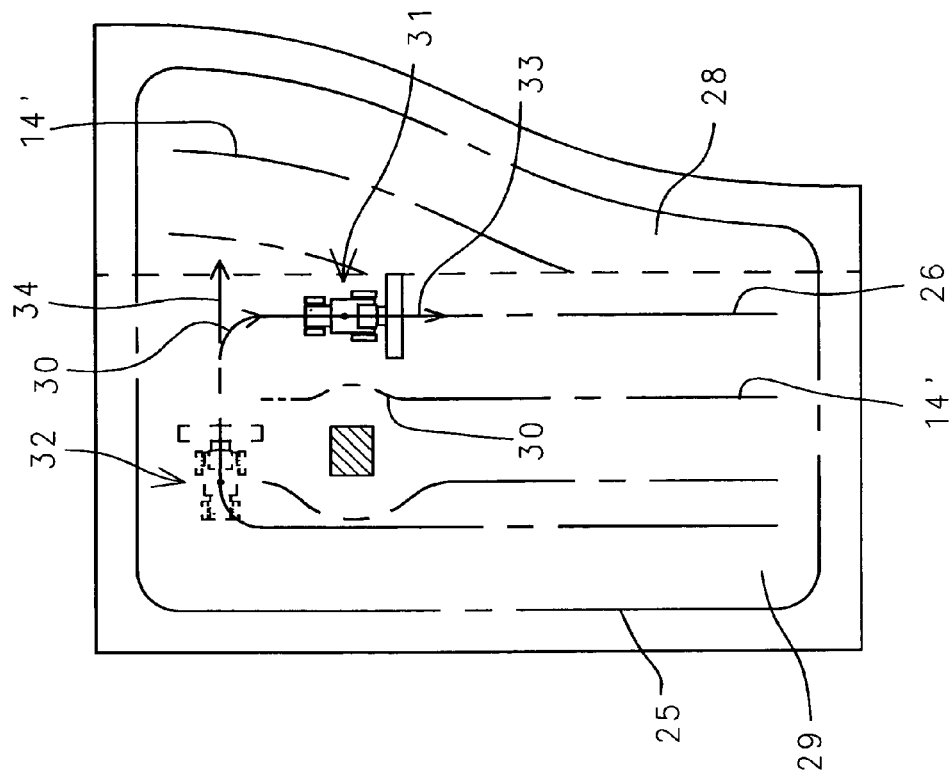
FIG. 3 shows an exemplary embodiment of the route planning system and method according to the present invention.
Figure 3:
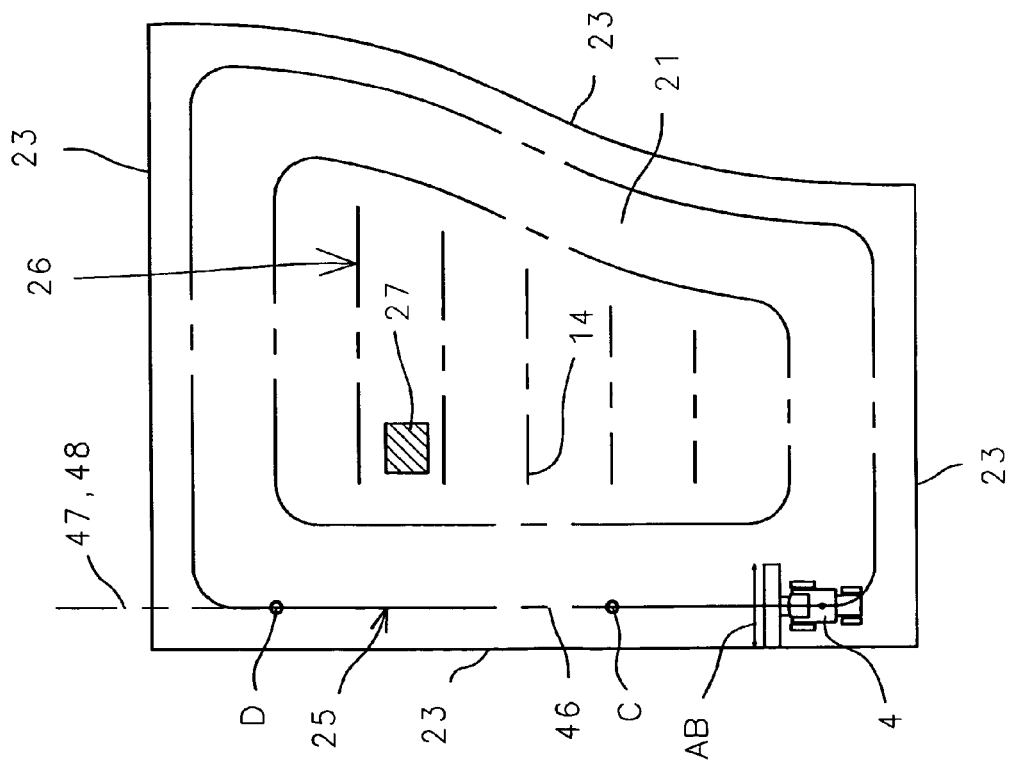

According to FIG. 3, territory 21 to be covered can include one or more obstacles 27 that agricultural working machine 4 must drive around. In addition, operator 5 can decide, e.g., to change driving route 14 generated by route planning system 1 by dividing up territory 21 to be worked. In the simplest case, this can take place by operator 5 intervening in the controls of agricultural working machine 4 and implementing a manual steering maneuver with the purpose, e.g., of subdividing territory 21 to be worked into first and second sub-areas 28, 29. Operator 5 often makes a subjective decision based on highly diverse criteria as to which working directions and field subdivisions permit a territory 21 to be worked efficiently. These subjective criteria can be, e.g., the division of territory 21 to be worked into simple geometric figures with straight edges that require few steering maneuvers or driving around obstacles 27 or immature, wet or stored grain stocks. When, in these cases, operator 5 specifies a new driving path 30, route planning system 1 can immediately access previously-generated driving route 14. This is accomplished in this case by the present invention in that route planning system 1 recognizes the deviation of actual machine position 31 from target machine position 32 determined by generated driving route 14 and the change in actual machine orientation 33 from target machine orientation 34 and, based on this new machine position 31, 33, determines a new driving route 14', whereby new generated driving route 14' takes territory 21 already covered into account.

In an analogous manner, operator 5 can intervene in the steering procedure to drive around obstacles 27. In the exemplary embodiment shown, a case is shown in FIG. 3 for reasons of simplicity in which operator 5 manually controls the entire steering procedure to drive around obstacle 27 along a driving path 30 until pre-determined driving route 14 is reached again. It is within the scope of the present invention that operator 5 initiates the avoidance procedure and route planning system 1, starting with this change in position of agricultural working machine 4, automatically determines a new driving route 14'. Based on the fact that route planning system 1 operates in a GPS-based manner, it is also feasible that route planning system 1 can access information regarding obstacles permanently integrated in territory 21 to be worked, such as trees, and automatically take their position into account when creating driving route 14, 14'. As a result of this immediate reaction of route planning system 1 to interventions by operator 5 in the steering procedure of agricultural working machine 4, a dynamic route planning system 1 is created that can react very flexibly to changes in driving route 14. A route planning system 1 of this type is made even more flexible and highly precise when route planning system 1 permanently determines actual machine position 31 and actual machine orientation 33 and, as a function of this position data, carries out a permanent adaptation of driving route 14, 14' of agricultural working machine 4.

Figure 4:
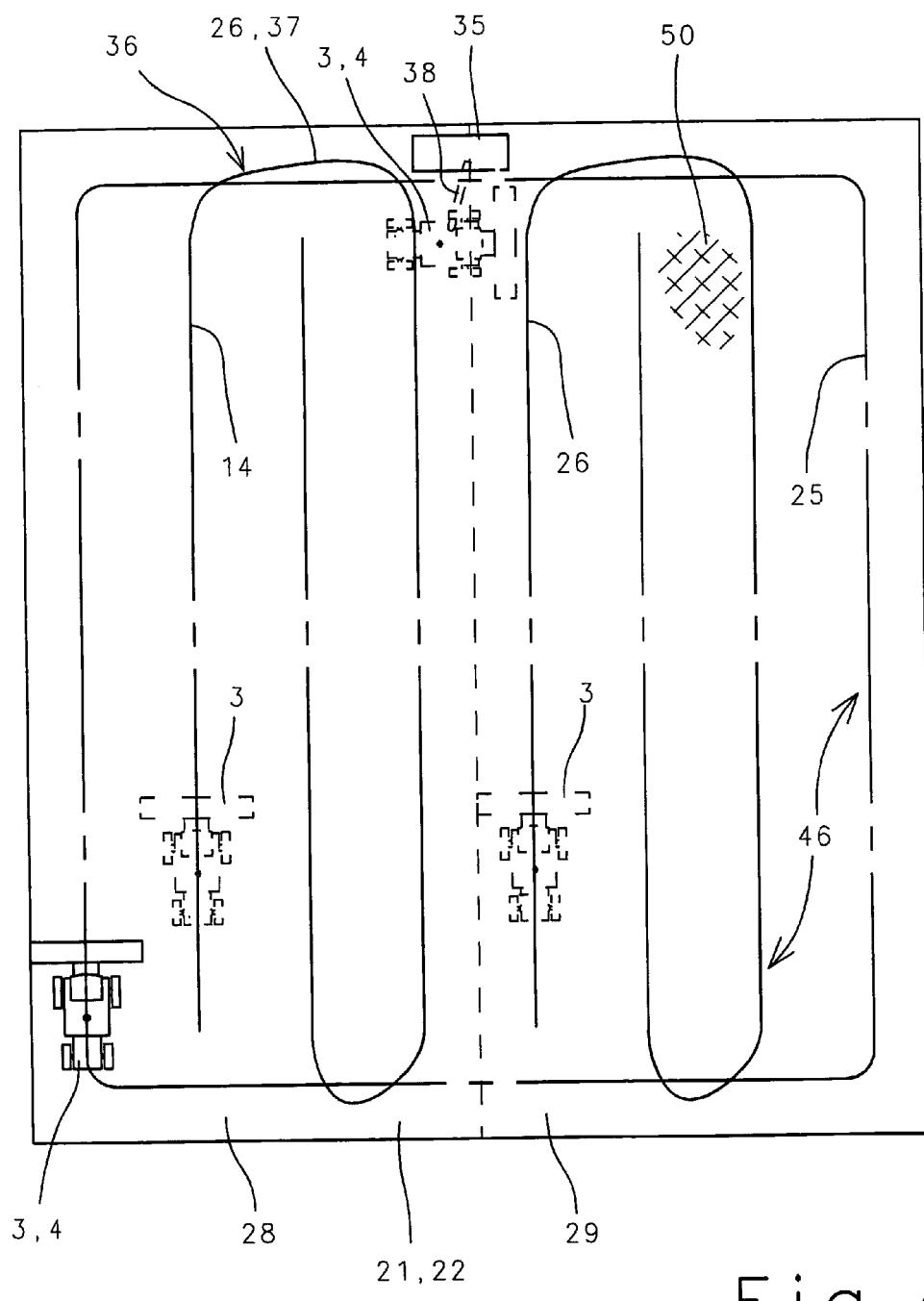
FIG. 4 shows a further exemplary embodiment of the route planning system and method according to the present invention.

According to previous embodiments, driving routes 14, 14' determined by route planning system 1 are composed of a large number of driving paths 25, 26, whereby the definition of these driving paths 25, 26 can depend on the length, orientation and processing sequence of highly diverse optimization criteria 11. A grain field 22, as shown in FIG. 4, is usually harvested such that one or more combine harvesters 3 harvest the grain and bring the harvested crops to one or more hauling vehicles 35 located on territory 21 to be harvested. It is extremely important that the various vehicles 4, 35 in use cover short driving paths on territory 21 with consideration for a ground-saving method of working. In addition, an efficient harvesting procedure is also defined by short harvesting times and, associated therewith, a small proportion of unproductive auxiliary time. For this reason, route planning system 1 takes into account, in its stored computation algorithms 10, the determining optimization criteria 11 "shortest driving path", "shortest working time", and/or "small proportion of unproductive auxiliary time". In the simplest case, mathematical relationships between the GPS-based position data of agricultural working machine 4, hauling vehicle 35 and outer contours 23 of territory 21 to be worked are defined in computation algorithms 10 as a function of selectable or specified working machine-specific data 12 or field-specific 13, said data to be described in greater detail below.

A further optimization parameter 11 that is directly related to those stated above concerns "short auxiliary drives between consecutive driving paths 25, 26 to be worked". According to FIG. 4, combine harvester 3 would have to carry out a considerable amount of auxiliary driving if the working sequence of individual driving paths 26 would be carried out on both sides, extending from the outside to the inside. In this case, optimization can be carried out such that computation algorithms 10 determine an optimized working sequence that can be composed, e.g., by first subdividing territory 21 formed by transversely extending driving paths 26 into first and second sub-areas 28, 29, so that separate driving routes 14 are subsequently assigned to each of these sub-areas 28, 29. A further optimization criterium 11 can be "recognition and working of known driving routes 14 and sequences". Territory 21 to be driven over is traveled by highly diverse agricultural working machines 4 during a single cultivation and harvesting phase. Particular territory 21 is also worked repeatedly throughout the year. In both cases, it is an advantage if the process of generating driving routes 14 can be considerably reduced by configuring route planning system 1 such that it recognizes territories 21 and the previous working sequences and driving routes 14 generated earlier to work them, and can access them. Short driving routes and a small proportion of unproductive auxiliary time are also achieved by the fact that further optimization criteria 11 are the "minimization of drives between agricultural working machine 4 and hauling vehicle 35" and "short turn-around drives 36".

Due to the fact that agricultural field work is usually carried out by a plurality of agricultural working machines 4 working together, a particularly efficient route planning system 1 is created when route planning system 1 is capable of generating working strategies using computation algorithms 1 stored in said route planning system. In the simplest case, the working strategy is limited to the route planning system generating driving paths 25, 26 and "turn-around curves" 37, and specifying a defined sequence in which to work driving paths 25, 26 and turn-around curves 37. In the exemplary embodiment shown in FIG. 4, when two combine harvesters 3 are used, the working strategy could be, e.g., that route planning system 1—according to the previous embodiments—first subdivides territory 21 to be worked into first and second sub-areas 28, 29 and subsequently assigns a sub-area 28, 29 to each combine harvester 3. In this case, the working strategy essentially consists of taking into account the number and position of highly diverse agricultural working machines 4 in use on particular territory 21.

When carrying out an "load-transferring procedure", in particular, in which combine harvester 3 transfers the harvested crops it has stored during the harvesting travel to a hauling vehicle 35, it is particularly important that combine harvester 3 be able to easily assume a suitable unloading position relative to hauling vehicle 35, and that conflicts with further combine harvesters 3 that are filling hauling vehicle 35 be avoided. In the simplest case, this can be ensured by the working strategy determined by route planning system 1 taking into account the machine type-dependent machine kinematics, the geometry of territories 21 to be worked, in particular with regard for "turn-around drive" 36, and, if applicable, the position of obstacles 27 in territory 21 to be worked. The machine kinematics are working vehicle-specific data 12, which can be, e.g., possible curve radii and steering angles of a combine harvester 3, the geometry of its unloading device 38 and the dimensions of hauling vehicle 35. It is extremely important to take into account the geometry of territory 21 to be worked, particularly with the loading procedure depicted schematically in FIG. 4, since the loading procedure is shortened considerably when a loading position is easy to reach; this results in a reduction of the necessary auxiliary times. In addition, the working strategy can take into account crop conditions, such as laid grain, absence of vegetation, excessive moisture content, whereby information of this type is usually input by operator 5 of agricultural working machine 4 into route planning system 1.

The harvesting conditions and the geometry of territory 21 to be worked are "field-specific" data 13 in route planning system 1 according to the present invention. Furthermore, the working strategy generated by route planning system 1 can take customer requests into account such that the customer specifies, e.g., maximum limits for crop losses or working time. In addition, based on previous experience, the customer also often prefers a certain working sequence, e.g., based on the dried condition of the crops, which can vary greatly within territory 21 to be worked, due to diverse external influences. In addition, the working strategy can specify complete working sequences such that, while combine harvester 3 is still harvesting particular territory 21, subsequent processes such as pressing the straw set down on the field or breaking the stubble can be started.

Figure 5:
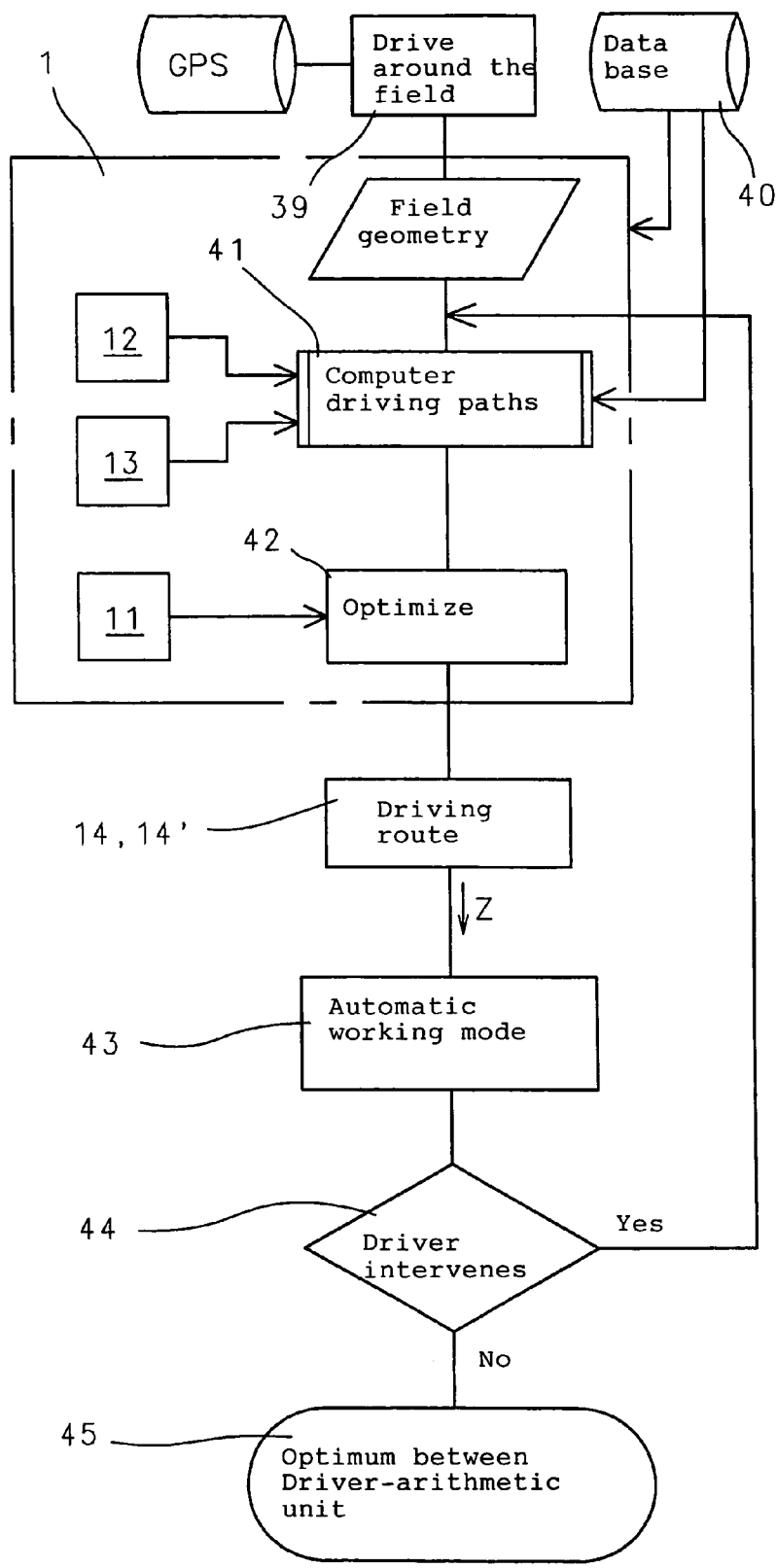
FIG. 5 shows the route planning system and method according to the present invention as a flow chart.

The method for determining driving routes 14 shown schematically in FIG. 1 could be structured, in the simplest case, as shown in the flow chart in FIG. 5, such that, in a first step, operator 5 of agricultural working machine 4 drives around territory 21 to be worked, whereby the geographical data of outer contour 23 of territory 21 is determined in a GPS-based manner. It is within the scope of the present invention that the geographical data for a known territory 21 can also be transferred from a data base 40 directly to route planning system 1. In route planning system 1, driving paths 14, 14' are calculated in a further processing step 41, using computation algorithms 10 described above and with consideration for working vehicle-specific and field-specific data 12, 13. In a further processing step 42 and with consideration for optimization criteria 11 described above, generated driving routes 14, 14' are optimized in route planning system 1 whereby, in the simplest case, generated driving route 14 is automatically worked first. As described above, this method step 43 is implemented by route planning system 1 generating control signals Z that intervene directly in steering 18 of agricultural working machine 4, so that it is guided automatically along generated driving route 14 on territory 21 to be worked. If, in a further working step 44, operator 5 of agricultural working machine 4 intervenes in the steering procedure or discards generated driving route 14, route planning system 1 according to the present invention determines a new driving route 14', and preliminary working steps 41-43 must be carried out again. This process repeats every time generated driving route 14 is discarded or the operator intervenes directly in the processing of a driving route 14 by actuating steering 18 of agricultural working machine 4, so that route planning system 1 according to the present invention always determines a driving route 14, 14' that is an optimum 45 between the requirements of operator 5 and consideration for diverse optimization criteria 11.

To now enable generated driving routes 14, 14' to be processed further electronically and in a simple manner, and to be depicted graphically and transparently, driving routes 14, 14' are described in route planning system 1 using "master lines" 46 as indicated in the illustration on the left in FIG. 1, whereby master lines 46 of adjacent driving paths 25, 26 are arranged such that they are offset from each other by the working width AB of agricultural working machine 4, or by a multiple thereof. As a result, territory 21 to be worked, which is defined by its outer contours 23, is described by a large number of master lines 46 that are separated from each other, whereby master lines 46 can also be drawn straight or curved, depending on the shape of outer contours 23. To ensure that master lines 46 are capable of replicating generated driving route 14, 14' with sufficient accuracy, making them suitable as a command variable for automatically influencing steering 18 of agricultural working machine 4, master lines 46 are always defined by two path points C, D separated by a distance, whereby a virtual extension 47 of master line 46 extending through these path points C, D serves as guide line 48. Since an exact depiction of curved driving paths 25, 26 requires a considerable number of path points C, D, but this requires a considerable amount of computing effort, it is provided in a further advantageous embodiment of the present invention that further computation algorithms 49 are assigned to route planning system 1 that reduce the number of path points C, D of curved driving paths 25, 26 depending on predefined or predefinable accuracy limits, so that, ultimately, generated driving path 14, 14' replicates territory 21 defined by its outer contours 23 with sufficient accuracy. To ensure that agricultural working machine 4 does not contact non-worked ground 50 on its turn-around drive 36, driving paths 25, 26 which form driving route 14, 14' are extended virtually in the region of turn-around drive 36, as shown in FIG. 3, so that agricultural working machine 4 must first be moved correspondingly far enough away from ground 50 before its makes the particular turning curve 37.

To ensure that operator 5 of agricultural working machine 4 can exert direct influence on the working sequence of driving paths 25, 26 that form driving route 14, 14', said driving paths are displayed in a visual manner to operator 5 using display unit 2 described above. Individual driving paths 25, 26 can be displayable permanently or only in certain sections, such as in the region of turn-around drive 36. To ensure that operator 5 is capable of easily changing the sequence in which driving paths 25, 26—which form driving route 14, 14'—can be worked, display unit 2 is designed as a "touch-screen" monitor 51, so that the next driving path 25, 26 to be worked can be selected directly on monitor 51. This has the advantage, particularly in the region of turn-around drive 36, that operator 5 can easily influence the subdivision of territory 21 to be worked into sub-areas 28, 29. In addition, means can be assigned to display unit 2 in a manner known per se that enable operator 5 to shift generated driving route 14, 14' entirely, or displace individual driving paths 25, 26 of this driving route 14, 14' on territory 21 to be worked, so that any inaccuracies in the generation of the driving route can be easily compensated for.

It lies within the abilities of one skilled in the art to modify route planning system 1 described above in a manner not shown or to use it in other machine systems to obtain the effects described, without leaving the scope of the present invention.

It will be understood that each of the elements described above, or two or more together, may also find a useful application in other types of constructions and methods differing from the types described above.

While the invention has been illustrated and described as embodied in route planning system for agricultural working machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A route planning system for agricultural working machines, comprising
 means for assigning a defined working width to the agricultural working machines to generate a planned driving route in a territory, and for dynamic adaptation of the planned driving route by recognizing a deviation in actual working machine position from a planned driving route position carried out by an operator steering a working machine in any manner and recognizing a change in a working sequence on a certain territory carried out by an operator of a working machine at any time, and based on said recognized deviation and said recognized change in working sequence, an actual machine position and an actual machine orientation, previously covered territory and at least one optimization criteria which is a shortest driving route or shortest working time of a working machine, generating a new driving route, thereby ensuring that the planned driving route to be covered is flexibly adaptable to changing external conditions including driving around obstacles, and automatically working the new driving route thereby largely relieving the operator of the agricultural working machine of the task of performing laborious steering maneuvers.

2. The route planning system for agricultural working machines as defined in claim 1,
 wherein said means is formed so that the dynamic adaptation of the driving route (14, 14') is carried out permanently.

3. The route planning system for agricultural working machines as defined in claim 1,
 wherein said means is formed so that the driving route (14, 14') is generated based on a large number of driving paths (25, 26), and the driving paths (25, 26) are determined based on optimization criteria (11).

4. The route planning system for agricultural working machines as defined in claim 1,
 wherein said means is formed so that the next driving path (25, 26) to be worked is selected based on optimization criteria (11).

5. The route planning system for agricultural working machines as defined in claim 4,
 wherein said means is formed so that the optimization criteria (11) can be also "small proportion of unproductive auxiliary time", "short auxiliary drives between successive driving paths (25, 26) to be worked", "recognition and working of known driving routes (14, 14') and sequences", and "minimize routes between agricultural working machine (3, 4) and hauling vehicle (35)".

6. The route planning system for agricultural working machines as defined in claim 1,
 wherein said means is formed so that the operator (5) of the agricultural working machine (25, 26) can discard the preselected driving route (14) and/or driving path (25, 26) and select any other driving path (25, 26, 80).

7. The route planning system for agricultural working machines as defined in claim 6,
 wherein said means is formed so that when the operator (5) of the agricultural working machine (4) discards the preselected driving route (14) and/or driving path (25, 26), a new driving route (14') is determined, composed of driving paths (25, 26).

8. A route planning system for agricultural working machines, comprising means for
 assigning a defined working width to the agricultural working machine to generate planned driving paths for working a territory,
 formulating a working strategy for working said territory and for recognizing a deviation in an actual working machine position with respect to a planned driving path carried out by an operator steering a working machine in any manner, and based on said deviation, an actual machine position and an actual machine orientation, previously covered territory and at least one optimization criteria which is a shortest driving route or shortest working time of a working machine, dynamically adapting the planned driving path to generate a new working path;
wherein said means formulates said working strategy by
connecting parallel driving paths (25, 26) and turning curves (37);
incorporating the number and position of additional agricultural working, machines (3, 4) used on the territory (21) to be worked;
considering the working machine kinematics (12), the geometry of the territory (21) to be worked and obstacles (27) in the territory (21) to be worked;
considering harvested crop conditions (13);
considering customer requests and
implementing specified working sequences whereby driving routes and associated working sequences of a large number of agricultural working machines are coordinated and driving paths composed of parallel driving paths and turn-around curves, of various agricultural working machines can be harmonized such that working machines that are working together always operate using substantially same driving paths and always turn around in substantially same areas.

9. The route planning system for agricultural working machines as defined in claim 8,
wherein said means is formed so that it stores driving routes (14, 14') and working strategies for a territory (21) to be worked and recognizes these stored driving routes (14, 14') and working strategies (14, 14') when they are worked again and automatically accesses these stored driving routes (14, 14') and working strategies.

10. The route planning system for agricultural working machines as defined in claim 8,
wherein said means is formed so that the driving route (14, 14') generated using the driving paths (25, 26) is based on a master line (46), whereby the driving paths (25, 26) based on the master line (46) are offset from the master line (46) and from each other by nearly the working width (AB) of the agricultural working machine (3, 4) or a multiple thereof.

11. The route planning system for agricultural working machines as defined in claim 9,
wherein said means is formed so that the master line (46) can be drawn straight or curved and whereby each master line (46) is formed based on two path points (C, D) separated by a distance, and a virtual extension (47) of the path of the master line (46) extending through these path points (C, D) serves as a guide line (48).

12. The route planning system for agricultural working machines as defined in claim 9,
wherein said means is formed so that the master line (46) is defined by the operator (5) of the agricultural working machine (3, 4).

13. The route planning system for agricultural working machines as defined in claim 11,
wherein said means is formed so that the guide line (48) is used to automatically guide the agricultural working machine (3, 4).

14. The route planning system for agricultural working machines as defined in claim 9,
wherein said means is formed so that a number of generated path points on curved master lines (46) is reduced by running a computation algorithm (49).

15. The route planning system for agricultural working machines as defined in claims 8,
wherein said means is formed so that the generated driving paths (25, 26) first follow the shape of outer contours (23) of the territory (21) to be worked and/or of obstacles (27) located in the territory (21) to be worked and subsequently extend nearly parallel to each other.

16. The route planning system for agricultural working machines as defined in claim 8,
wherein said means is formed so that a length of the driving paths (25, 26) is determined by the outer contour (23) of the territory (21) to be worked and/or of obstacles (27) to be driven around.

17. The route planning system for agricultural working machines as defined in claim 8,
wherein said means is formed so that the driving paths (25, 26) on the driving route (14, 14') are extended virtually so far that, on the turn-around route (36), the agricultural working machine (3, 4) moved past the driving path (25, 26) on the territory (21) to be worked is moved so far away from the territory (21) that the agricultural working machine (25, 26) can be turned around without contacting non-worked ground (50).

18. The route planning system for agricultural working machines as defined in claim 8,
wherein said means is formed so that a transition at an end of one driving path (25, 26) to the next driving path (25, 26) is determined by a turn-around procedure (36) defined by a turn-around curve (37) that can be calculated.

19. The route planning system for agricultural working machines as defined in claim 8,
wherein said means is formed so that further driving paths (25, 26) are displayed to the operator (5) of the agricultural working machine (3, 4), at least at ends of the particular driving path (25, 26), and the operator (5) can select the next driving path (25, 26) to be worked, and the route planning system (1) automatically determines turn-around curve (37) for this turn-around route (36), and the turn-around curve can be calculated based on a large number of driving routes (25, 26).

20. The route planning system for agricultural working machines as defined in claim 18,
wherein said means is formed so that the operator (5) can select the driving path (25, 26) by operating a touch-screen monitor (51).

21. The route planning system for agricultural working machines as defined in claim 8,
wherein said means is formed so that the operator (5) of the agricultural working machine (3, 4) can shift the generated driving paths (25, 26, 37).

22. A route planning method for agricultural working machines, comprising the steps of
assigning a defined working width to the agricultural working machines to generate planned driving routes in a territory; and
carrying out dynamic adaptation of the planned driving routes by recognizing a deviation in actual working machine position from a planned driving route position carried out by an operator steering a working machine in any manner, recognizing a change in a working sequence on a certain territory carried out by an operator of a working machine at any time and based on said recognized deviation and said recognized change in working sequence, an actual machine position and an actual machine orientation, previously covered territory and at least one optimization criteria which is a shortest driving route or shortest working time of a working machine, generating a new driving route to which the working machine is automatically adapted, thereby ensuring that a driving route to be covered is flexibly adaptable to changing external conditions including driving around obstacles, and automatically working the new driving route, thereby largely relieving the operator of the agricultural working machine of the task of performing laborious steering maneuvers.

23. The route planning method for agricultural working machines as defined in claim 22,
wherein said carrying out includes providing the dynamic adaptation of the driving route (14, 14') permanently.

24. The route planning method for agricultural working machines as defined in claim 22, further comprising generating the driving route (14, 14') based on a large number of driving paths (25, 26), and the driving paths (25, 26) are determined based on optimization criteria (11).

25. The route planning method for agricultural working machines as defined in claim 22, further comprising selecting the next driving path (25, 26) to be worked based on optimization criteria (11).

26. The route planning method for agricultural working machines as defined in claim 25, further comprising selecting the optimization criteria (11) to be also "small proportion of unproductive auxiliary time", "short auxiliary drives between successive driving paths (25, 26) to be worked", "recognition and working of known driving routes (14, 14') and sequences", and "minimize routes between agricultural working machine (3, 4) and hauling vehicle (35)".

27. The route planning method for agricultural working machines as defined in claim 22, further comprising discarding by the operator (5) of the agricultural working machine (25, 26) can the preselected driving route (14) and/or driving path (25, 26) and select any other driving path (25, 26, 80).

28. The route planning method for agricultural working machines as defined in claim 27, further comprising, when the operator (5) of the agricultural working machine (4) discards the preselected driving route (14) and/or driving path (25, 26), determining a new driving route (14') composed of driving paths (25, 26).

29. A route planning method for agricultural working machines, comprising the steps of
assigning a defined working width to the agricultural working machine to generate planned driving paths for working a territory,
formulating a working strategy for said working machines based on said assigned working widths,
recognizing a deviation in an actual working machine position carried out by an operator steering a working machine in any manner,
dynamically adapting a planned working path to generate a new working path based on said recognized deviation, an actual machine position and an actual machine orientation, previously covered territory and at least one optimization criteria which is a shortest driving route or shortest working time of a working machine,
carrying out the working strategy to include
connecting parallel driving paths (25, 26) and turning curves (37);
incorporating the number and position of additional agricultural working machines (3, 4) used on the territory (21) to be worked;
considering the working machine kinematics (12), the geometry of the territory (21) to be worked and obstacles (27) in the territory (21) to be worked;
considering harvested crop conditions (13);
considering customer requests; and
implementing specified working sequences whereby driving routes and associated working sequences of a large number of agricultural working machines are coordinated so that the working strategy is formulated by harmonizing the driving paths including parallel driving paths and turn-around curves of various agricultural working machines such that working machines that are working together always use substantially same driving paths and always turn around in substantially same areas.

30. The route planning method for agricultural working machines as defined in claim 29, further comprising storing driving routes (14, 14') and working strategies for a territory (21) to be worked and recognizing these stored driving routes (14, 14') and working strategies (14, 14') when they are worked again and automatically accessing these stored driving routes (14, 14') and working strategies.

31. The route planning method for agricultural working machines as defined in claim 29, further comprising generating the driving paths (25, 26) based on a master line (46), whereby the driving paths (25, 26) based on the master line (46) are offset from the master line (46) and from each other by nearly the working width (AB) of the agricultural working machine (3, 4) or a multiple thereof.

32. The route planning method for agricultural working machines as defined in claim 30, further comprising drawing the master line (46) straight or curved and thereby forming each master line (46) based on two path points (C, D) separated by a distance, and providing a virtual extension (47) of the path of the master line (46) extending through these path points (C, D) to serve as a guide line (48).

33. The route planning method for agricultural working machines as defined in claim 30, further comprising defining the master line (46) by the operator (5) of the agricultural working machine (3, 4).

34. The route planning method for agricultural working machines as defined in claim 32, further comprising using the guide line (48) to automatically guide the agricultural working machine (3, 4).

35. The route planning method for agricultural working machines as defined in claim 30, further comprising reducing a number of generated path points on curved master lines (46) by running a computation algorithm (49).

36. The route planning method for agricultural working machines as defined in claims 29, further comprising generating the driving paths (25, 26) so that they follow the shape of outer contours (23) of the territory (21) to be worked and/or of obstacles (27) located in the territory (21) to be worked and subsequently extend nearly parallel to each other.

37. The route planning method for agricultural working machines as defined in claim 29, further comprising determining a length of the driving paths (25, 26) by the outer contour (23) of the territory (21) to be worked and/or of obstacles (27) to be driven around.

38. The route planning method for agricultural working machines as defined in claim 29, further comprising extending the driving paths (25, 26) on the driving route (14, 14') virtually so far that, on the turn-around route (36), the agricultural working machine (3, 4) moved past the driving path (25, 26) on the territory (21) to be worked is moved so far away from the territory (21) that the agricultural working machine (25, 26) can be turned around without contacting non-worked ground (50).

39. The route planning method for agricultural working machines as defined in claim 29, further comprising determining a transition at an end of one driving path (25, 26) to the next driving path (25, 26) by a turn-around procedure (36) defined by a turn-around curve (37) that can be calculated.

40. The route planning method for agricultural working machines as defined in claim 29, further comprising displaying further driving paths (25, 26) to the operator (5) of the agricultural working machine (3, 4), at least at ends of the particular driving path (25, 26), so that the operator (5) can select the next driving path (25, 26) to be worked, automatically determining turn-around curve (37) for this turn-around route (36), and calculating the turn-around curve based on a large number of driving routes (25, 26).

41. The route planning method for agricultural working machines as defined in claim 39, further comprising selecting by the operator (5) the driving path (25, 26) by operating a touch-screen monitor (51).

42. The route planning method for agricultural working machines as defined in claim 29, further comprising shifting by the operator (5) of the agricultural working machine (3, 4) the generated driving paths (25, 26, 37).

\* \* \* \* \*